(12) United States Patent
Akiba et al.

(10) Patent No.: US 8,180,109 B2
(45) Date of Patent: May 15, 2012

(54) IMAGE DISPLAY APPARATUS AND IMAGE DISPLAY SYSTEM FOR VEHICLE

(75) Inventors: Kazuyoshi Akiba, Nagoya (JP); Toshihiro Hattori, Okazaki (JP); Masayuki Imanishi, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 993 days.

(21) Appl. No.: 12/213,897

(22) Filed: Jun. 26, 2008

(65) Prior Publication Data

US 2009/0010567 A1    Jan. 8, 2009

(30) Foreign Application Priority Data

Jul. 2, 2007  (JP) ................................. 2007-174078

(51) Int. Cl.
*G06K 9/00* (2006.01)
(52) U.S. Cl. ...................................... 382/104; 382/298
(58) Field of Classification Search .................. 382/104, 382/284, 298; 348/25; 701/301; 340/937, 340/435, 436, 437
See application file for complete search history.

(56) References Cited

U.S. PATENT DOCUMENTS

| | | | | |
|---|---|---|---|---|
| 5,987,174 | A | 11/1999 | Nakamura et al. | 382/199 |
| 2002/0110262 | A1* | 8/2002 | Iida et al. | 382/104 |
| 2005/0083405 | A1 | 4/2005 | Imoto et al. | 348/148 |
| 2005/0083427 | A1 | 4/2005 | Imoto | 348/335 |
| 2005/0249379 | A1 | 11/2005 | Yoshimura | 382/104 |
| 2006/0227138 | A1 | 10/2006 | Oizumi | 345/428 |
| 2009/0102858 | A1 | 4/2009 | Eggers et al. | 345/617 |

FOREIGN PATENT DOCUMENTS

| | | |
|---|---|---|
| JP | A-7-223488 | 8/1995 |
| JP | A-7-334665 | 12/1995 |
| JP | A-2004-023472 | 1/2004 |
| JP | 2005-112267 A | 4/2005 |
| JP | 2006-246430 A | 9/2006 |
| JP | A-2007-110177 | 4/2007 |
| JP | 2007-288586 A | 11/2007 |

OTHER PUBLICATIONS

Office Action dated May 28, 2010 in corresponding German application No. 10 2008 029 916.2.
"TOPVIEW Camera," www.alpine.co.jp (ALPINE Mobile Media Solution) (English translation enclosed).
Office Action mailed Sep. 6, 2011 in corresponding JP application No. 2007-174078 (and English translation).

* cited by examiner

*Primary Examiner* — Andrew W Johns
(74) *Attorney, Agent, or Firm* — Posz Law Group, PLC

(57) ABSTRACT

If a display mode is set to a narrow angle enlargement image mode, an enlargement image area is inputted via a touch panel. A transformation is made to compress an image of a not-enlargement image area other than the enlargement image area, and a narrow angle enlargement image is generated to enable simultaneously displaying, as a narrow angle enlargement image, (i) the enlarged image in the enlargement image area and (ii) the compressed image in the not-enlargement image area. When a warning target is detected, a corresponding image area is enlarged. An audio alarm is outputted via a speaker. Further, a new narrow angle enlargement image is generated so as to merge the initial narrow angle enlargement image with an image of enlarging the image area of the warning target. A display window including the new narrow angle enlargement image is then displayed in a display device.

23 Claims, 7 Drawing Sheets

NARROW ANGLE IMAGE

FIG. 5B

WIDE ANGLE IMAGE

FIG. 6A

WIDE ANGLE IMAGE

FIG. 6B

NARROW ANGLE ENLARGEMENT IMAGE

FIG. 7A

WIDE ANGLE IMAGE

FIG. 7B

NARROW ANGLE ENLARGEMENT IMAGE

FIG. 8A

NARROW ANGLE ENLARGEMENT IMAGE

FIG. 8B

NARROW ANGLE ENLARGEMENT IMAGE

IMAGE DISPLAY APPARATUS AND IMAGE DISPLAY SYSTEM FOR VEHICLE

CROSS REFERENCE TO RELATED APPLICATION

This application is based on and incorporates herein by reference Japanese Patent Application No. 2007-174078 filed on Jul. 2, 2007.

FIELD OF THE INVENTION

The present invention relates to image display apparatus and an image display system for a vehicle.

BACKGROUND OF THE INVENTION

An image display apparatus is configured to enlarge a certain partial area of an image in vicinity to a vehicle captured by a wide angle camera to thereby perform an enlargement image display of the certain partial area if a predetermined condition is satisfied (for example, refer to Patent document 1).

Patent document 1: JP-2005-112267A

In such an enlargement image display of the certain partial area, an image or information in other area other than the certain partial area are invisible in the display. If an obstacle against safe driving is present in the other area within the image captured by the camera, the driver of the vehicle may lose sight of the obstacle. This may pose a disadvantage to decrease a safety level in driving the vehicle.

For example, a partial area in back of a subject vehicle under a backing operation is displayed in an enlargement display window. In such a case, a different vehicle may enter an area which is excluded from the enlargement display window. A problem may thereby arise that the subject vehicle collides with the different vehicle since the different vehicle is not displayed.

SUMMARY OF THE INVENTION

The present invention is made in view of the problem above. It is an object to provide an image display apparatus capable of widely observing images of a monitoring object and its vicinity.

According to an example of the present invention, an image display apparatus is provided as follows. An image capture device is configured to acquire an image of an area including a monitoring target. A display device is configured to display information including an image. A display control device is configured to enlarge a first image area included in the image acquired by the image capture device and display in the display device a first display image which includes (i) the enlarged first image area and (ii) a second image area, which is included in the image acquired by the image capture device and other than the first image area.

As another example of the present invention, an image display system for a vehicle is provided by comprising the above image display apparatus in the vehicle.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

An embodiment according to the present invention will be explained with reference to drawings. In addition, the embodiment of the present invention can be modified in various manners within a technical scope of the present invention without being limited to the following embodiment.

(First Embodiment)

Figure 1:
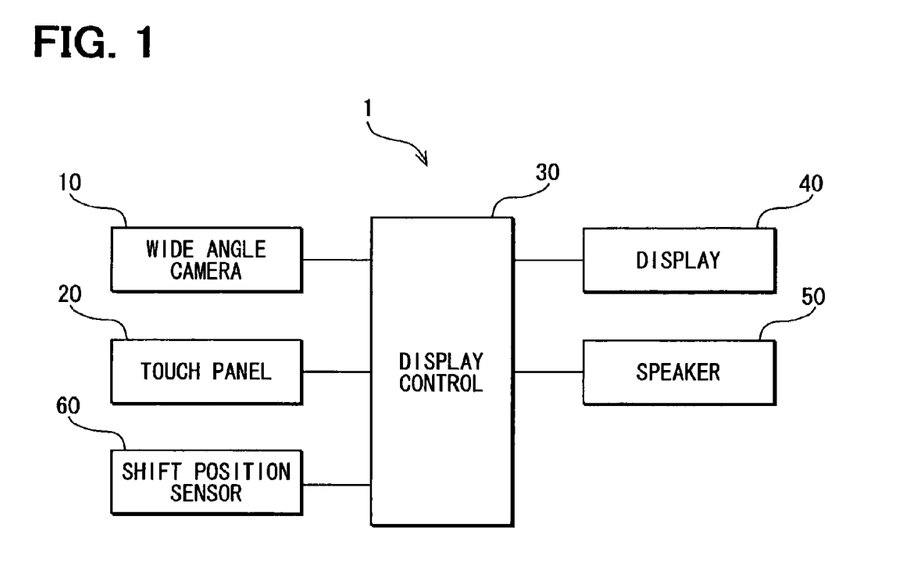
FIG. 1 is a block diagram illustrating an overall configuration of an in-vehicle image display system according to a first embodiment of the present invention.

FIG. 1 is a block diagram illustrating an overall configuration of an in-vehicle image display system 1 according to a first embodiment of the present invention. The in-vehicle image display system 1 is configured to include an image display apparatus and a shift position sensor 60. Further, the image display apparatus is configured to include a wide angle camera 10, a display device 40, a touch panel 20, a speaker 50, and a display controller 30. In other words, the image display apparatus is provided along with the shift position sensor 60 to thereby configure the in-vehicle image display system provided in a subject vehicle.

The wide angle camera 10 is attached to a rear of the vehicle (not shown). The camera 10 functions as an image capture device to have a lens which acquires or capture an image of an area in back of the vehicle as a stereographic projection image or wide angle camera image with a visual angle of 180 degrees. The display device 40 is used for displaying various kinds of information including images captured by the camera 10 and images having undergone image processing performed by the display controller 30. For instance, an LCD or CRT display may be adopted as the display device 40.

The touch panel 20 is used to change display images, display windows, or display modes for displaying images on a screen of the display device 40 by a user's input operation (called display mode change). Thus, the touch panel 20 functions as a display image input device. The touch panel 20 is used further to select or designate an image area (enlargement image area) which is to be enlarged by a user's input operation (called enlargement area selection). Thus, the touch panel 20 functions also as an enlargement area input device. The touch panel 20 is arranged on a screen of the display device 40, and performs the above mentioned display mode change or enlargement area selection based on a motion of a user's finger.

In addition, the display modes include two modes of (i) a wide angle image mode for displaying only a wide angle image and (ii) a narrow enlargement image mode for displaying an integrated image which integrates a wide angle image and a compressed image with each other. The speaker 50 functions as a warning device to perform audio warning using an alarm sound, warning speech, or the like upon receiving a signal from the display controller 30.

The shift position sensor 60 functions as a shift position detection device to detect a shift position of a gear of the vehicle. The sensor 60 may be a potentiometer to detect a position of a shift lever or a limit switch prepared in each shift position (backward, first gear, second gear, drive).

The display controller 30 functions as a display control device to include a CPU, ROM, RAM, or I/O (not illustrated) to execute the following processes (1) to (6).

(1) The display controller 30 simultaneously displays (i) a first image area (enlargement image area) and (ii) a second image area (not-enlargement image area). The first image area is a portion included in the image acquired from the wide angle camera 10 and displayed in enlargement. The second image area is other than the first image area in the display device 40.

(2) The display controller 30 changes (i) a wide angle image acquired from the wide angle camera 10 and (ii) a narrow angle enlargement image, in which a partial area (enlargement image area) is enlarged and displayed (display mode change).

(3) The display controller 30 enlarges, of the image acquired from the wide angle camera 10, images in an area selected as an enlargement image area via the touch panel 20 and displays the enlarged images in the enlargement image area.

(4) The display controller 30 executes a compression process to reduce or compress images in an image area (not-enlargement image area) other than the enlargement image area and displays the compressed images in the not-enlargement image area.

In the compression process, the following processes (a) to (c) are performed.

(a) The display controller 30 displays, in the display device 40, a single display window including simultaneously both the image area enlarged and the image area compressed. In the window, the compressed image area is displayed as being arranged in a periphery of the enlarged image area such that the enlarged image area and the compressed image area seamlessly connected with each other.

(b) In the compressed image area, images are compressed with more than one compression ratio.

(c) The different compression ratios for reducing or compressing the images are decreased continuously without up and down as a distance from a display center of the enlarged image area increases.

Figure 2:
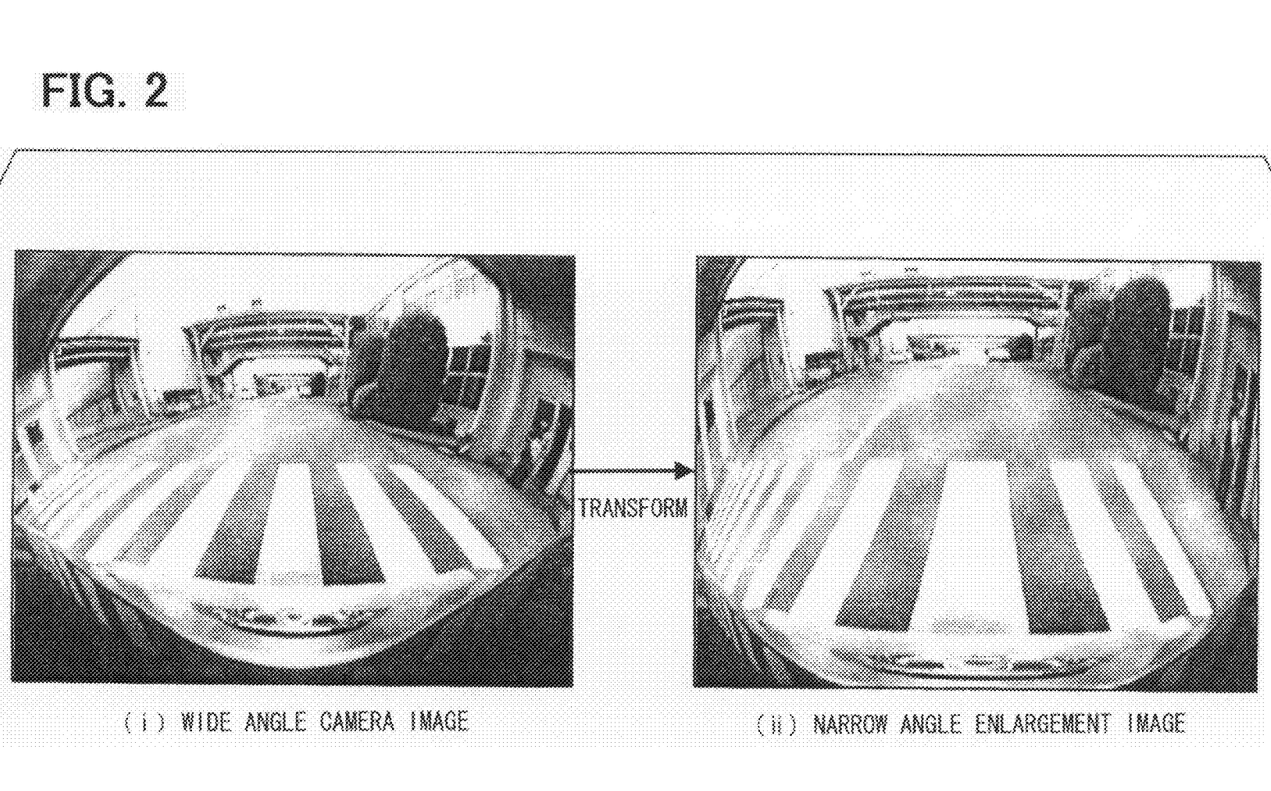
FIG. 2 illustrates image examples of (i) a wide angle camera image acquired by a wide angle camera and (ii) a narrow angle enlargement image.

Herein, the process explained in (a)-(c) is explained based on FIG. 2 and Expression 1 to Expression 4. FIG. 2 illustrates examples of (i) a wide angle (camera) image acquired from the wide angle camera 10 and (ii) a narrow angle enlargement image. The wide angle camera 10 generally captures an image with a predetermined visible angle (for instance, 180 degrees).

The following transformation represented by Expression 1 is introduced. The coordinates (Xb, Yb) of each pixel of the acquired image are inputted; thereby the coordinates (Xa, Ya) are obtained. Thus, a central image area of the acquired image is enlarged; a peripheral image area is compressed to such an extent that existence of a warning target such as a pedestrian is discernible.

$$\begin{pmatrix} X_a \\ Y_a \end{pmatrix} = \begin{pmatrix} F(X_b) & 0 \\ 0 & G(Y_b) \end{pmatrix} \begin{pmatrix} X_b \\ Y_b \end{pmatrix} \quad \text{[Expression 1]}$$

Herein, F and G use a model formula represented by Expression 2.

$$F = G = \frac{1 + B \cdot \exp(-C \cdot Z)}{A} \quad \text{[Expression 2]}$$

Herein, F and G indicate an enlargement ratio or magnifying power relative to an input value Z when the center of the image is designated as the origin. For instance, the left image (i) of FIG. 2 is an image (prior to transformation) acquired from the wide angle camera 10 while the right image (ii) of FIG. 2 is an image (posterior to transformation) obtained as the result of transformation when (A, B, C)=(15, 30, 0.00238).

The relational expression of the inputted image and display image obtained when the above transformation is used is expressed by Expression 3.

$$\begin{pmatrix} X_a \\ Y_a \end{pmatrix} = \begin{pmatrix} \frac{1 + B \cdot \exp(-C \cdot X_b)}{A} & 0 \\ 0 & \frac{1 + B \cdot \exp(-C \cdot Y_b)}{A} \end{pmatrix} \begin{pmatrix} X_b \\ Y_b \end{pmatrix} \quad \text{[Expression 3]}$$

In order to actually generate a transformation image, it is necessary to calculate the coordinates (Xb, Yb) of the inputted image relative to the coordinates (Xa, Ya) of the display image using Expression 4.

$$\begin{pmatrix} X_b \\ Y_b \end{pmatrix} = \begin{pmatrix} \frac{A}{1 + B \cdot \exp(-C \cdot X_b)} & 0 \\ 0 & \frac{A}{1 + B \cdot \exp(-C \cdot Y_b)} \end{pmatrix} \begin{pmatrix} X_a \\ Y_a \end{pmatrix} \quad \text{[Expression 4]}$$

(5) The display controller 30 extracts a warning target which enters an area other than an area corresponding to the enlargement image area.

(6) The display controller 30 determines whether a warning target is detected: when a warning target is detected, the display controller 30 displays in enlargement a predetermined area including the detected warning target and warns by outputting the audio sound via the speaker 50. Thus, the display controller 30 functions also as a warning target detection device.

(Display Process in Display Controller)

Figure 3:
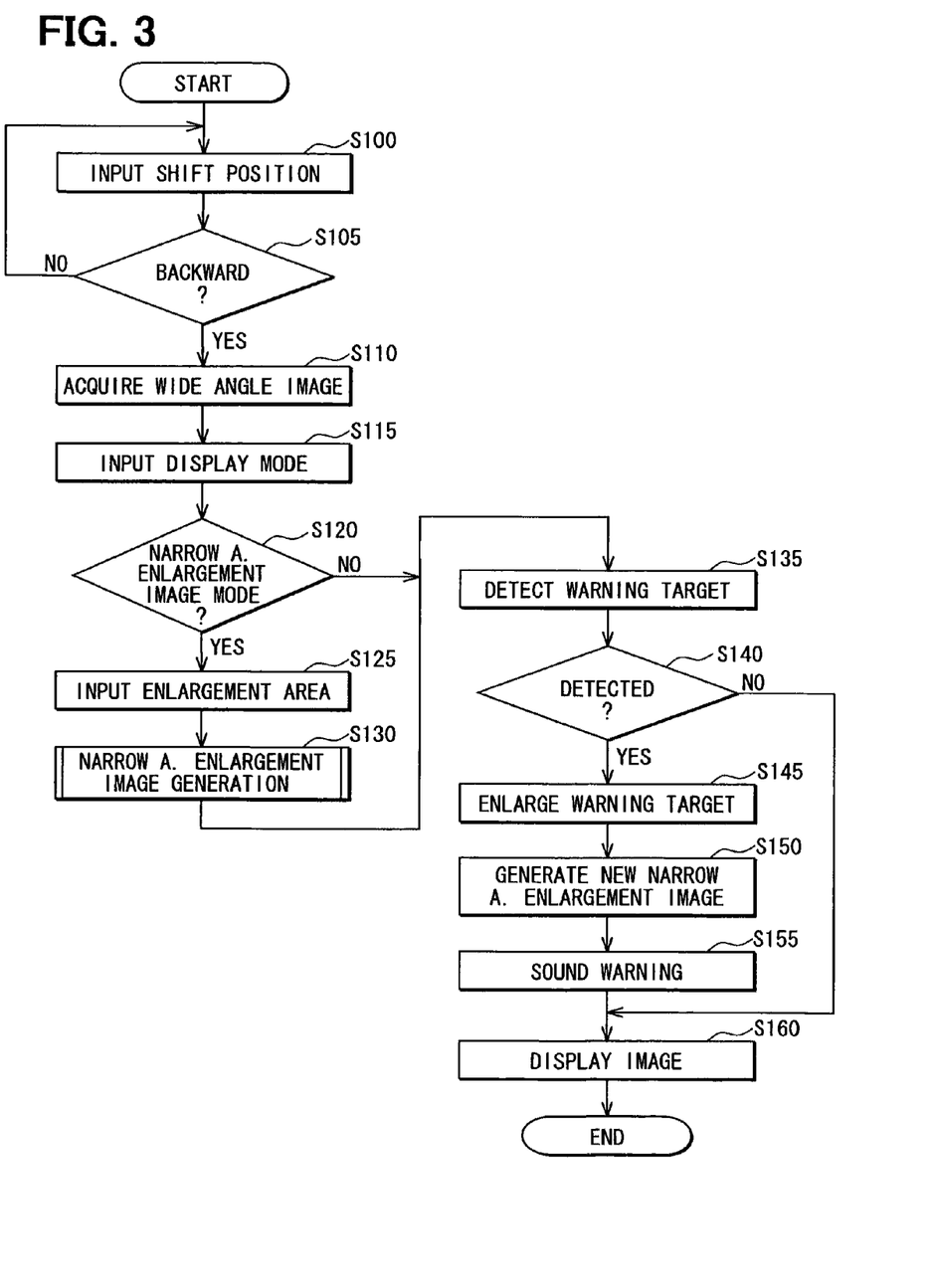
FIG. 3 is a flowchart of a display control process.

Next, according to FIG. 3, a display control process executed by the display controller 30 is explained. FIG. 3 is a flowchart of the display control process.

The display control process is started when the in-vehicle image display system 1 is turned on and repeated while the system is turned on. At first, at S100, a shift position of the gear of the vehicle is inputted from the shift position sensor 60. At S105, it is determined whether the inputted shift position is a backward position.

When the shift position is the backward position (S105: Yes), the processing advances to S110. When the shift position is not the backward position (S105: No), the processing returns to S100.

At S110, a wide angle image is acquired from the wide angle camera 10. At S115, a display mode is inputted from the touch panel 20. The input of the display mode is executed by the user to select one of "narrow angle enlargement image mode" and "wide angle image mode," both of which are illustrated in a predetermined area on the touch panel 20, through making a finger approximate or touch it.

At S120, it is determined whether the selected display mode is the "narrow angle enlargement image mode." When the selected display mode is "narrow angle enlargement image mode" (S120: Yes), the processing advances to S125. When the selected display mode is not the "narrow angle enlargement image mode" but "wide angle image mode" (S120: No), the processing advances to S135.

At S125, an enlargement image area which is to be enlarged is acquired via the touch panel 20. For instance, in the touch panel 20, a display window appears which prompts the user to input the enlargement area. The user then designates the enlargement area via the touch panel 20. The enlargement area designated by the user is thereby acquired.

At S130, the narrow angle enlargement image or image window is generated. Generating the narrow angle enlargement image is explained later. At S135, a warning target is to be detected. For instance, the warning target is detected by image processing and defined as an object having a risk of an accident or collision such as a vehicle, a person, or an animal which enters an area corresponding to a not-enlargement image area, which is other than the enlargement image area.

For example, the image processing is executed with respect to the entering object based on a velocity relative to the subject vehicle, a distance to the subject vehicle, a size, a color, etc. It is determined thereby whether the entering object is a warning target such as a vehicle, a person, an animal, etc.

At S140, it is determined whether a warning target is detected at S135. When a warning target is detected (S140: Yes), the processing advances to S145. When any warning target is not detected (S140: No), the processing advances to S160 and a predetermined image, which corresponding to the mode determined at S120, is displayed.

That is, when the selected display mode is determined to be the narrow angle enlargement image mode, the narrow angle enlargement image is displayed in the display device 40. When it is determined to be the wide angle image mode, the wide angle image which is acquired from the wide angle camera 10 is displayed. Then, the processing is once ended. As explained above, while the system 1 is turned on, the process is repeatedly executed.

At S145, an image is generated where a predetermined area including the detected warning target and its vicinity is enlarged, for instance, from the narrow angle enlargement image generated at S130. In addition, an enlargement ratio or magnifying power may be fixed or varied according to a size of the detected warning target.

At S150, a new narrow angle enlargement image with a warning object considered is generated so as to consider the detected warning target, for instance, by replacing the warning target in the narrow angle enlargement image generated at S130 with the enlargement image relative to the warning target generated at S145.

At S155, an audio output for warning is performed via the speaker 50.

For example, the audio output may be a synthesized speech such that "an object likely colliding with your vehicle is approaching." Such an audio output may be an alarming sound, chime sound, etc. instead of the synthesized speech.

At S160, the new narrow angle enlargement image generated at S150 is displayed as a new narrow angle enlargement image or image window with the warning target considered in the display device 40. Then, the processing is once ended. Further, as explained above, while the system 1 is turned on, the process is repeatedly executed.

(Narrow Angle Enlargement Image Generation Process)

Figure 4:
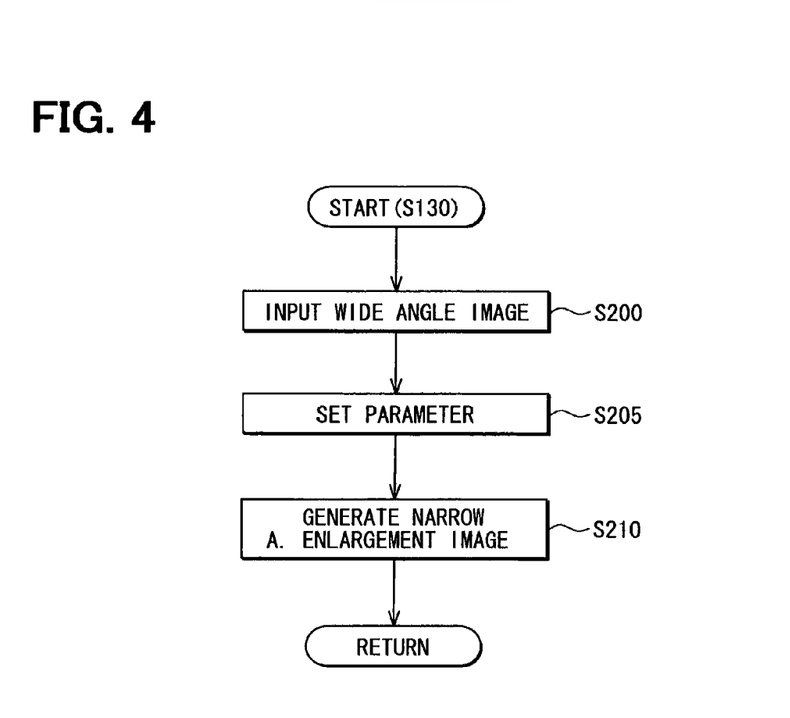
FIG. 4 is a flowchart of a narrow angle enlargement image generation process.

Next, a narrow angle enlargement image generation process executed by the display controller 30 is explained with reference to a flowchart in FIG. 4.

At S200, the image of the wide angle camera 10 which is acquired at S110 (refer to FIG. 3) of the display control process is inputted. At S205, a parameter for coordinate transformation is designated from the enlargement area designated or inputted at S125 of the display control process. That is, the enlargement ratio according to the distance from the center of the image and the enlargement area acquired after transformation can be varied with the parameter (A, B, C) of Expressions 1 to 4 mentioned above.

For example, according to the enlargement area inputted at S125, the value of C is determined first. When the enlargement area is narrow, C becomes a large value; when the enlargement area is large, C becomes a small value.

Next, the enlargement ratio of the determined enlargement area is determined. If A is large and B is small, the enlargement ratio becomes small; if A is small and B is large, the enlargement ratio becomes large.

The enlargement ratio may be a fixed value previously stored in a ROM or RAM of the display controller 30, or able to be designated by a user. At S210, the image inputted at S200 is transformed according to the above-mentioned Expressions 1 to 4 using the parameter (A, B, C) designated at S205 to thereby generate a narrow angle enlargement image. After generating the narrow angle enlargement image, the process is terminated and processing returns to the display control process in FIG. 3.

(Feature of In-vehicle Image Display System)

In such an in-vehicle image display system 1, even if a partial image area of the image acquired by the wide angle camera 10 is enlarged and displayed, other image area (i.e., not-enlargement image area) other than the enlarged image area (i.e., enlargement image area) is simultaneously displayed in the display device 40. This may be referred to as a narrow angle enlargement image or image window.

Therefore, even if an object enters an area corresponding to the not-enlargement image area, the object may be observed by a user of the system 1. That is, while monitoring an area corresponding to the enlargement image area in detail, the user can observe a wide area simultaneously.

Further, the display controller 30 can change (i) a wide angle image, which is acquired from the wide angle camera 10 and (ii) a narrow angle enlargement image, in which a partial image area of the image acquired from the wide angle camera 10 is enlarged.

This can provide a user with the in-vehicle image display system easy to use.

In addition, a partial image area (i.e., enlargement image area) to be enlarged is selected from the image acquired by the wide angle camera 10 by using the touch panel 20. Thus, the user can conveniently designate a partial image area to be enlarged for display, from the image acquired by the wide angle camera 10.

Furthermore, since the compression process is applied to the image area (not-enlargement image area) other than the area enlarged (enlargement image area), a display area or window in the display device 40 can be lessened. In addition, both (i) the enlarged image and (ii) the compressed image arranged in a periphery of the enlarged image are simultaneously displayed in a signal display window in a seamless manner. Thus, almost all of the image acquired from the wide angle camera 10 can be checked in the single display window.

In addition, since the enlarged image area and compressed image area are observed at once, the user can not only focus on the enlarged image area but also easily observe the compressed image area.

Figure 5A:
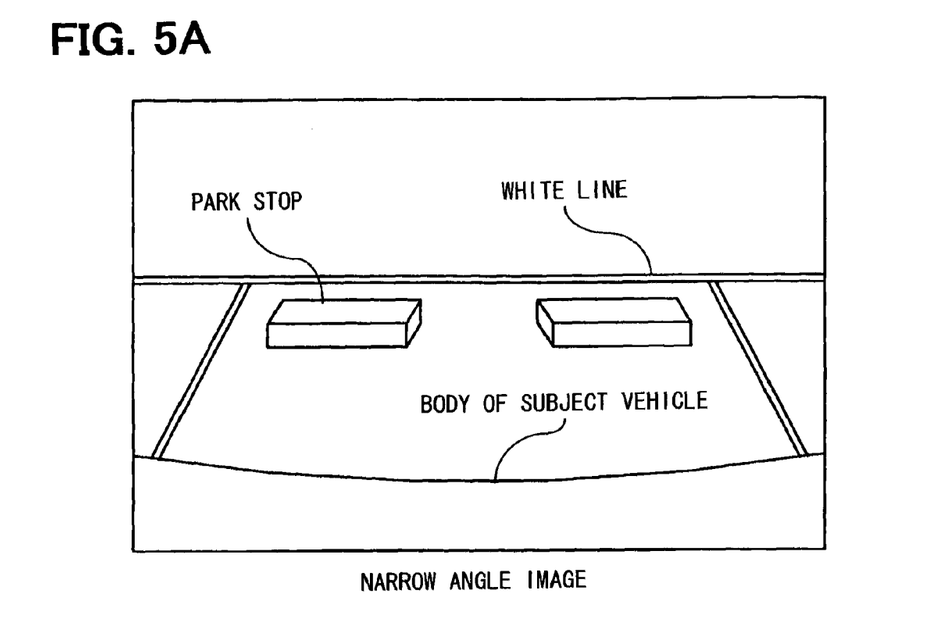
FIGS. 5A, 5B are comparative examples of (i) a narrow angle image and (ii) a wide angle image, respectively.
Figure 5B:
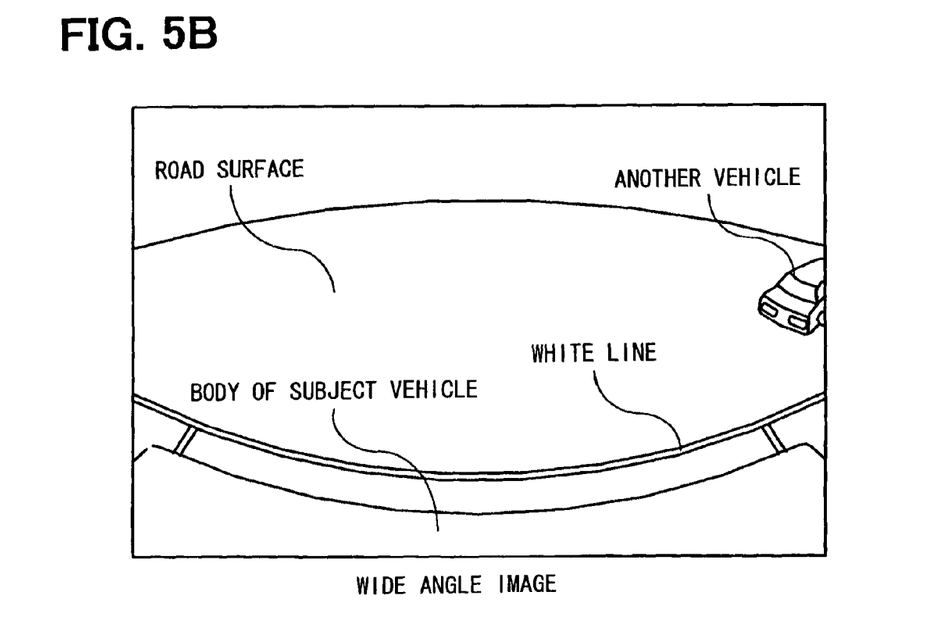
Figure 6A:
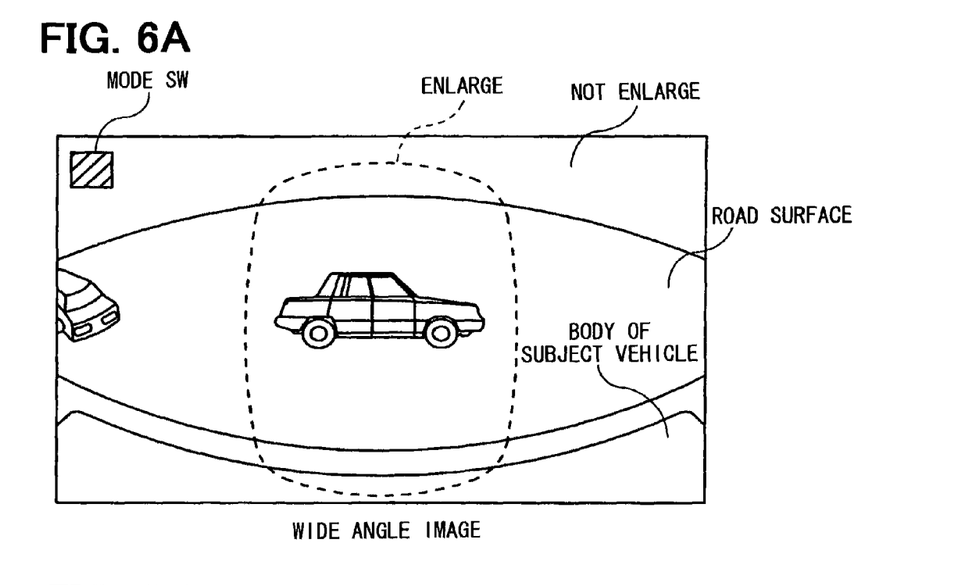
FIGS. 6A, 6B are examples of (i) a wide angle image and (ii) a narrow angle enlargement image, respectively, with another vehicle in back captured.

In addition, since a compression ratio for the compressed image area can be varied based on a distance from the center of the enlarged image area (i.e., enlargement image area), several images having different compression ratios can be easily acquired through the image processing. In order to illustrate an advantage of the embodiment, a comparative example is shown as FIGS. 5A, 5B, which are a narrow angle image and a wide angle image, respectively. In contrast, FIGS. 6A, 6B are examples of a wide angle image and a narrow angle enlargement image which enlarges a central area of the wide angle image, respectively, while another vehicle is observed in back of the subject vehicle.

Figure 6B:
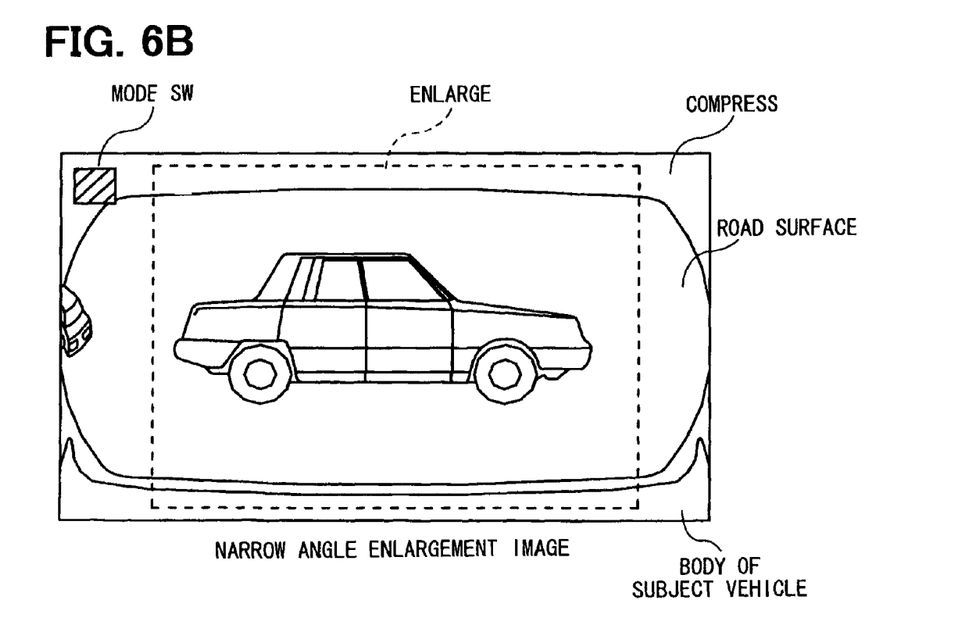
Figure 7A:
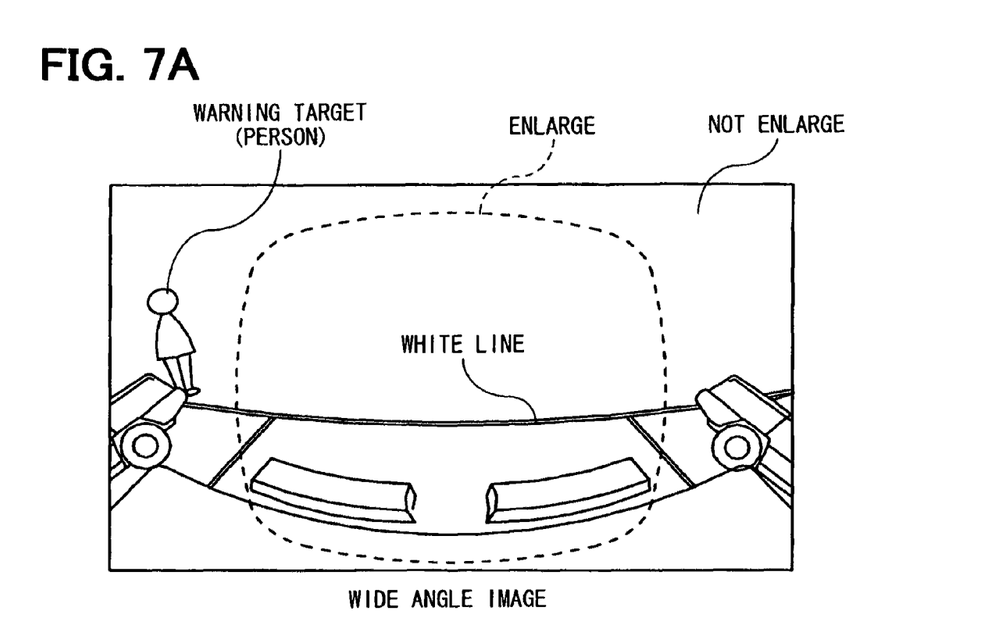
FIGS. 7A, 7B are examples of (i) a wide angle image and (ii) a narrow angle enlargement image, respectively, with a person in a parking lot captured.
Figure 7B:
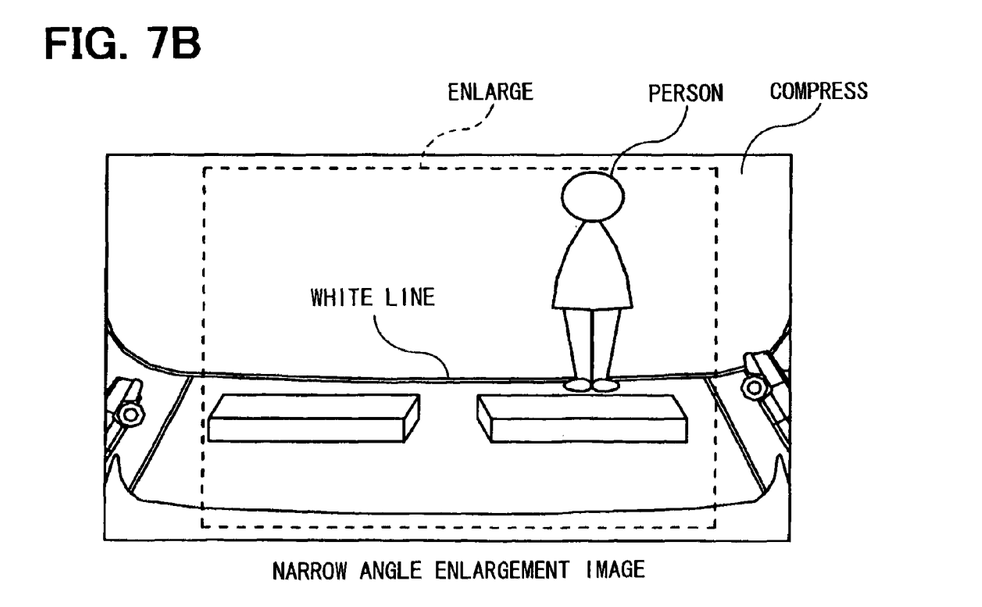

Further, FIGS. 7A, 7B are examples of a wide angle image and a narrow angle enlargement image which enlarges a central area of the wide angle image, respectively, while a person is observed in a parking lot. In addition, FIGS. 6A, 6B (or FIGS. 7A, 7B) can be switchable therebetween by pressing a switch button provided on the touch panel 20.

As illustrated in FIGS. 6B, 7B, while the vehicle or person positioned in the central area of the image can be clearly observed, a different vehicle exists in an end area or peripheral area of each narrow angle enlargement image can be also observed. In addition, in the in-vehicle image display system 1, an object which is observed in an area (i.e., not-enlargement image area) other than the enlargement image area is extracted. If the extracted object is detected to be a warning target, a predetermined area including the warning target can be enlarged and displayed. Such a configuration can help prevent the user from not noticing the warning object entering the area corresponding to the not-enlargement image area since such an image area including the warning object is enlarged anew. Therefore, the image display system can be configured to certainly monitor an entrance of a warning target.

Figure 8A:
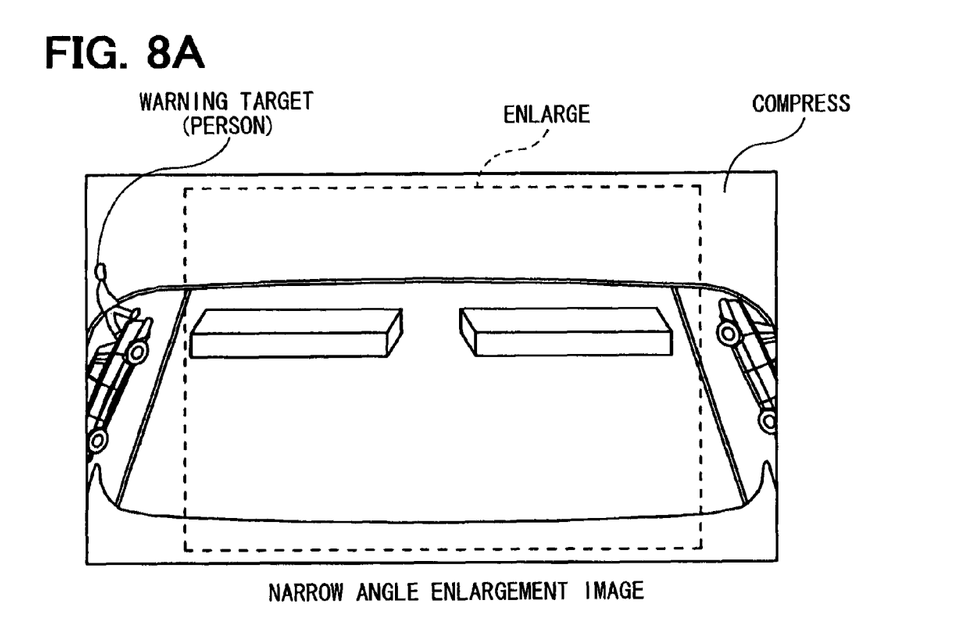
FIG. 8A is an example of a narrow angle enlargement image with a warning target observed in a compressed image area.
Figure 8B:
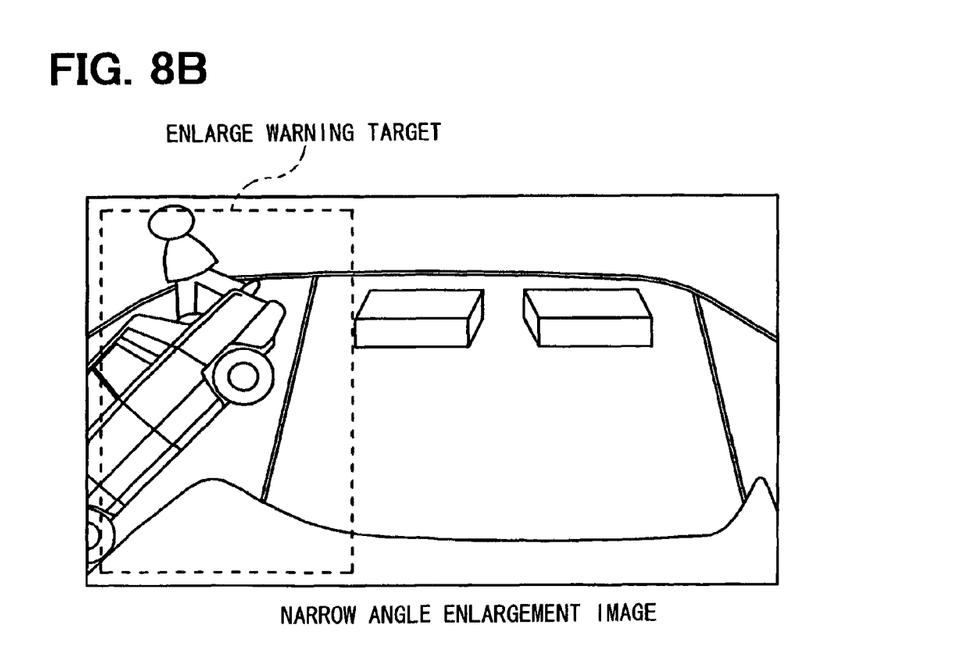
FIG. 8B is an example of a narrow angle enlargement image with a warning target enlarged.

In addition, when a predetermined area including the warning target is displayed in enlargement, for example, several displaying methods can be adopted. That is, only the predetermined area may be enlarged; otherwise, other image area other than the predetermined area may be compressed to be thereby displayed in compression. FIG. 8A is an example of a narrow angle enlargement image generated when a person as a warning target enters an area corresponding to the compressed image area. FIG. 8B is an example of a narrow angle enlargement image while the person having entered the area corresponding to the compressed image area is displayed in enlargement. Herein, in FIG. 8B, when the predetermined area including the person having entered is enlarged, other image area other than the predetermined area is displayed in compression.

Thus, since a warning target such as a vehicle or person entering is displayed in enlargement, the warning target can be easily monitored, thereby providing a safe driving to the user.

Furthermore, when the warning target is detected, an alarm sound or synthetic speech for warning can be outputted via the speaker 50. Therefore, warning to the user can be ensured, therefore, providing an image display system capable of certainly monitoring entrance of a warning target.

In addition, the image display system 1 is mounted in a vehicle. Therefore, the backing operation of the vehicle can be performed while paying attention on a whole area of the displayed image acquired from the wide angle camera 10 as well as monitoring a vicinity, in particular, in back of the vehicle using the enlarged image. Especially, warning is made to the driver at the time of operating the vehicle; thus, the safety in the driving can be improved.

(Second Embodiment)

In the first embodiment, the image transformation is made according to Expressions 1 to 4 and the compressed image is obtained. In a second embodiment, another processing method is adopted to obtain a compressed image in the in-vehicle image display system 1.

The configuration of the in-vehicle image display system 1 and the display control process by the display controller 30 in the second embodiment are the same as those in the first embodiment. The explanation is therefore mainly made to different part from the first embodiment.

In the second embodiment, the display controller 30 is configured to transform a stereographic projection image acquired by the wide angle camera 10 into an equal distance projection image to thereby display an enlarged image area and a compressed image area as an integrated single image.

For instance, in a narrow angle enlargement image generation process of the second embodiment, after the image of the wide angle camera 10 is inputted at S200, a parameter is not designated at S205. Alternatively, Expression 5 is substituted for Expressions 1 to 4 at S210 for image transformation.

That is, the image acquired by the wide angle camera 10 is the stereographic projection image. Such a stereographic projection image is transformed into an equal distance projection image using Expression 5.

$$x_{equid} = x_{stereo} \times \frac{2 \times f \times \arctan\left(\frac{r_{stereo}}{2f}\right)}{r_{stereo}}$$

$$y_{equid} = y_{stereo} \times \frac{2 \times f \times \arctan\left(\frac{r_{stereo}}{2f}\right)}{r_{stereo}}$$

$$r_{stereo} = \sqrt{x_{stereo}^2 + y_{stereo}^2}$$

[Expression 5]

Herein, $x_{equid}$: x coordinate of equal distance projection image after transformation $y_{equid}$: y coordinate of equal distance projection image after transformation $x_{stereo}$: x coordinate of stereographic projection image before transformation $y_{stereo}$: y coordinate of stereographic projection image before transformation $r_{stereo}$: distance between $x_{stereo}$ and $y_{stereo}$ In such an in-vehicle image display system 1, a wide-angle lens is used for the wide angle camera 10; therefore, a configuration can be simple without necessity of complicated configuration. In addition, in order to transform or change the stereographic projection image into the equal distance projection image, a general transformation equation of Expression 5 with few calculation loads is only required. The image data processing can be executed easily.

(Other Embodiments)

Although the embodiments are described above, the present invention is not limited to the embodiments and can be modified.

(1) In the first embodiment and second embodiment, the image display system or apparatus is provided in a vehicle. However, it may be not necessary to be limited to the in-vehicle use. For example, it can be directed to monitoring at a fixed point such as an intersection.

(2) In the first embodiment and second embodiment, in order to change display modes, the touch panel is used, but it can be replaced with a mechanical switch such as a pushbutton switch.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

According to an aspect of the disclosure, an image display apparatus is provided as follows. An image capture device is configured to acquire an image of an area including a monitoring target. A display device is configured to display information including an image. A display control device is configured to enlarge a first image area included in the image acquired by the image capture device and display in the display device a first display image which includes (i) the enlarged first image area and (ii) a second image area, which is included in the image acquired by the image capture device and other than the first image area.

Under the above configuration, even if an object or obstacle enters the second image area excluded from the first image area which is displayed in an enlargement manner in the display device, a user can monitor the object within the displayed image or window. That is, while the first image area being enlarged can be observed in detail, a wide image area covering the first and second image areas can be observed.

For instance, a user can monitor a person or vehicle, which enters an area other than an area enlarged in the corresponding display image. Further, a user may want to view an image acquired by the image capture device directly without modification instead of the above partially enlarged display image.

Thus, as an optional aspect of the image display apparatus, a display image input device may be configured to receive an input operation for switching display images. Herein the display control device may switch in the display device, based on the input operation received by the display image input device, (i) the first display image including the enlarged first image area and the second image area and (ii) a display image having the image acquired by the image capture device, therebetween.

This can provide a user with the apparatus easy to use. As an optional aspect of the image display apparatus, an enlargement area input device may be configured to receive an input operation for designating an enlargement image area which is to be enlarged. Herein the display control device may be configured to enlarge the enlargement image area designated as the first image area based on the input operation via the enlargement area input device. Thus, the user can conveniently designate a partial image area to be enlarged for display, from the image acquired by the image capture device.

As an optional aspect of the image display apparatus, the display control device may be configured to execute a compression process to compress the second image area other than the first image area, and display, in the display device, the compressed second image area. This can eliminate a disadvantage or necessity of increasing a display window size when the image acquired by the image capture device is directly displayed without the size modified.

As an optional aspect of the image display apparatus, the display control device may be configured to display, in a single integrated image, the enlarged first image area and the compressed second image area such that the enlarged first image area is seamlessly connected with the compressed second image area which is in a periphery of the enlarged first image area. Thus, the whole of the image acquired by the image capture device can be observed in the single integrated display image or image window. In other words, the user can gaze at the image area enlarged while additionally viewing the image area compressed.

As an optional aspect of the image display apparatus, the image capture device may be configured to acquire the image as a stereographic projection image, and the display control device may be configured to display the enlarged first image area and the compressed second image area as the single integrated image by transforming the acquired stereographic projection image into an equal distance projection image.

Under such a configuration, the image capture device can be configured as being simple. Furthermore, through the easy image data processing, the enlarged image area and compressed image area can be integrated or combined with each other to be thereby displayed as a single integrated image or image window.

The stereographic projection image can be easily acquired by using a wide angle lens; thereby, the image capture device can be configured to have a simple structure. In addition, in order to transform or change the stereographic projection image into the equal distance projection image, a general transformation equation with few calculation loads is only required. The image data processing can be executed easily.

As an optional aspect of the image display apparatus, the display control device may be configured to generate the reduced second image area which includes a plurality of images compressed with individually different compression ratios.

Further, the display control device may be configured to vary the individually different compression ratios with respect the plurality of images included in the reduced second image area based on distances from a center of the enlarged first image area.

Under such a configuration, the image capture device is not required to have a complicated configuration, for example, a configuration of multiple lens having multiple focal lengths. The multiple images having different compression ratios can be realized by image data processing.

Furthermore, an object (warning target) may advance into an area corresponding to the compressed image area. In such a case, since a user is apt to see the enlarged image area, the user may not notice that the warning target has entered even though the warning target is displayed in-the compressed image area. For example, a vehicle or person may advance into an area corresponding to the image area compressed. In such a case, the user may not notice the vehicle or person entering the area.

As an optional aspect of the image display apparatus, a warning target detection device may be configured to extract a warning target which enters in the second image area other than the first image area. Herein the display control device may be configured to determine that the warning target is detected by the warning target detection device to thereby enlarge a predetermined image area including the detected warning target and display the enlarged predetermined image area.

Such a configuration can help prevent the user from not noticing the warning object entering the area corresponding to the image area, which is in a periphery of an image area enlarged, since such an image area including the warning object in the periphery is enlarged. Therefore, the image display apparatus can be configured to certainly monitor an entrance of a warning target. Herein, "a predetermined image area including the warning target" means "a predetermined image area including the warning target alone" or "a predetermined image area defined as a predetermined peripheral area including the warning target and its vicinity."

As an optional aspect of the image display apparatus, a warning device may be configured to perform a warning operation. Herein the display control device may be configured to determine that the warning target is detected by the warning target detection device to thereby cause the warning device to perform a warning operation relative to the detected warning target.

Such a configuration can certainly provide the user with a warning, therefore providing the image display apparatus which can monitor warning objects more certainly.

The above image display apparatus can be used for various uses. For example, the apparatus can be used for fixed point surveillance at an intersection of roads. Further, the apparatus can be used in an in-vehicle system.

For instance, if the apparatus is used in an in-vehicle image display system mounted in a subject vehicle, an image displayed in an enlarged size enables a secured periphery monitoring for the subject vehicle.

As an optional aspect of the image display apparatus, a shift position detection device may be configured to detect a shift position of a gear of the vehicle. Herein, the image capture device may be attached to the vehicle so as to acquire an image in back of the vehicle, and the display control device may be configured to display, in the display device, the first display image which includes (i) the enlarged first image area and (ii) the second image area, when the shift position detection device detects that the shift position of the gear is at a shift for backing operation of the vehicle.

Under such a configuration, when the subject vehicle enters in backing operation after the user sets the shift lever to a backward position, the following takes place. That is, a first image area of the image acquired by the image capture device is enlarged and displayed in the display device; a second image area other than the first image area is also displayed along with the enlarged first image area in the display device.

Therefore, when the subject vehicle is started or parked with backing operation, a dead angle in back of the subject vehicle is eliminated to thereby enhance safety in driving the subject vehicle. Furthermore, if a warning target is detected, an enlargement display or warning operation is performed to thereby also enhance the safety in driving the subject vehicle.

It will be obvious to those skilled in the art that various changes may be made in the above-described embodiments of the present invention. However, the scope of the present invention should be determined by the following claims.

What is claimed is:

1. An image display apparatus comprising:
   an image capture device configured to acquire an image of an area including a monitoring target;
   a display device configured to display information including an image; and
   a display control device configured to enlarge a first image area included in the image acquired by the image capture device and display in the display device a first display image which includes (i) the enlarged first image area and (ii) a second image area, which is included in the image acquired by the image capture device and other than the first image area,
   wherein
   the display control device is configured to execute a compression process to compress the second image area other than the first image area, and display, in the display device, the compressed second image area,
   the display control device is configured to display, in a single integrated image, the enlarged first image area and the compressed second image area such that the enlarged first image area is seamlessly connected with the compressed second image area which is in a periphery of the enlarged first image area,
   the image capture device is configured to acquire the image as a stereographic projection image, and
   the display control device is configured to display the enlarged first image area and the compressed second image area as the single integrated image by transforming the acquired stereographic projection image into an equal distance projection image.

2. The image display apparatus according to claim 1, further comprising:
   a display image input device configured to receive an input operation for switching display images,
   wherein the display control device switches in the display device, based on the input operation received by the display image input device, (i) the first display image including the enlarged first image area and the second image area and (ii) a display image having the image acquired by the image capture device, therebetween.

3. The image display apparatus according to claim 1, further comprising:
   an enlargement area input device configured to receive an input operation for designating an enlargement image area which is to be enlarged,
   wherein the display control device is configured to enlarge the enlargement image area designated as the first image area based on the input operation via the enlargement area input device.

4. The image display apparatus according to claim 1, wherein
   the display control device is configured to generate the reduced second image area which includes a plurality of images compressed with individually different compression ratios.

5. The image display apparatus according to claim 4, wherein
   the display control device is configured to vary the individually different compression ratios with respect the plurality of images included in the reduced second image area based on distances from a center of the enlarged first image area.

6. The image display apparatus according to claim 1, further comprising:
   a warning target detection device configured to extract a warning target which enters in the second image area other than the first image area, wherein
   the display control device is configured to determine that the warning target is detected by the warning target detection device to thereby enlarge a predetermined image area including the detected warning target and display the enlarged predetermined image area.

7. The image display apparatus according to claim 6, further comprising:
   a warning device configured to perform a warning operation, wherein the display control device is configured to determine that the warning target is detected by the warning target detection device to thereby cause the warning device to perform a warning operation relative to the detected warning target.

8. An image display system for a vehicle, the system comprising:
the image display apparatus according to claim 1 provided in the vehicle.

9. The image display system according to claim 8, further comprising:
a shift position detection device configured to detect a shift position of a gear of the vehicle,
wherein:
the image capture device is attached to the vehicle so as to acquire an image in back of the vehicle; and
the display control device is configured to display, in the display device, the first display image which includes (i) the enlarged first image area and (ii) the second image area, when the shift position detection device detects that the shift position of the gear is at a shift for backing operation of the vehicle.

10. An image display apparatus comprising:
an image capture device configured to acquire an image of an area including a monitoring target;
a display device configured to display information including an image; and
a display control device configured to enlarge a first image area included in the image acquired by the image capture device and display in the display device a first display image which includes (i) the enlarged first image area and (ii) a second image area, which is included in the image acquired by the image capture device and other than the first image area,
wherein
the display control device is configured to execute a compression process to compress the second image area other than the first image area, and display, in the display device, the compressed second image area,
the display control device is configured to display, in a single integrated image, the enlarged first image area and the compressed second image area such that the enlarged first image area is seamlessly connected with the compressed second image area which is in a periphery of the enlarged first image area, and
the display control device is configured to generate the reduced second image area which includes a plurality of images compressed with individually different compression ratios.

11. The image display apparatus according to claim 10, wherein
the display control device is configured to vary the individually different compression ratios with respect the plurality of images included in the reduced second image area based on distances from a center of the enlarged first image area.

12. An image display system for a vehicle, the system comprising:
the image display apparatus according to claim 10 provided in the vehicle.

13. The image display system according to claim 12, further comprising:
a shift position detection device configured to detect a shift position of a gear of the vehicle,
wherein:
the image capture device is attached to the vehicle so as to acquire an image in back of the vehicle; and
the display control device is configured to display, in the display device, the first display image which includes (i) the enlarged first image area and (ii) the second image area, when the shift position detection device detects that the shift position of the gear is at a shift for backing operation of the vehicle.

14. An image display apparatus comprising:
an image capture device configured to acquire an image of an area including a monitoring target;
a display device configured to display information including an image;
a display control device configured to enlarge a first image area included in the image acquired by the image capture device and display in the display device a first display image which includes (i) the enlarged first image area and (ii) a second image area, which is included in the image acquired by the image capture device and other than the first image area; and
a warning target detection device configured to extract a warning target which enters in the second image area other than the first image area, wherein
the display control device is configured to determine that the warning target is detected by the warning target detection device to thereby enlarge a predetermined image area including the detected warning target and display the enlarged predetermined image area.

15. The image display apparatus according to claim 14, further comprising:
a warning device configured to perform a warning operation, wherein
the display control device is configured to determine that the warning target is detected by the warning target detection device to thereby cause the warning device to perform a warning operation relative to the detected warning target.

16. The image display apparatus according to claim 14, further comprising:
a display image input device configured to receive an input operation for switching display images,
wherein the display control device switches in the display device, based on the input operation received by the display image input device, (i) the first display image including the enlarged first image area and the second image area and (ii) a display image having the image acquired by the image capture device, therebetween.

17. The image display apparatus according to claim 14, further comprising:
an enlargement area input device configured to receive an input operation for designating an enlargement image area which is to be enlarged,
wherein the display control device is configured to enlarge the enlargement image area designated as the first image area based on the input operation via the enlargement area input device.

18. The image display apparatus according to claim 14, wherein
the display control device is configured to execute a compression process to compress the second image area other than the first image area, and display, in the display device, the compressed second image area.

19. The image display apparatus according to claim 18, wherein
the display control device is configured to display, in a single integrated image, the enlarged first image area and the compressed second image area such that the enlarged first image area is seamlessly connected with the compressed second image area which is in a periphery of the enlarged first image area.

20. The image display apparatus according to claim 19, wherein:
the image capture device is configured to acquire the image as a stereographic projection image; and
the display control device is configured to display the enlarged first image area and the compressed second image area as the single integrated image by transforming the acquired stereographic projection image into an equal distance projection image.

21. An image display system for a vehicle, the system comprising:
the image display apparatus according to claim 14 provided in the vehicle.

22. The image display system according to claim 21, further comprising:
a shift position detection device configured to detect a shift position of a gear of the vehicle,
wherein:
the image capture device is attached to the vehicle so as to acquire an image in back of the vehicle; and
the display control device is configured to display, in the display device, the first display image which includes (i) the enlarged first image area and (ii) the second image area, when the shift position detection device detects that the shift position of the gear is at a shift for backing operation of the vehicle.

23. The image display system according to claim 14, wherein
the warning target detection device is configured to extract the warning target through image processing of the image.

* * * * *